Aug. 8, 1950
F. A. DERGINER ET AL
2,517,547
AUTO BODY SELF-ADJUSTING SPRING DOLLY
Filed Oct. 29, 1948
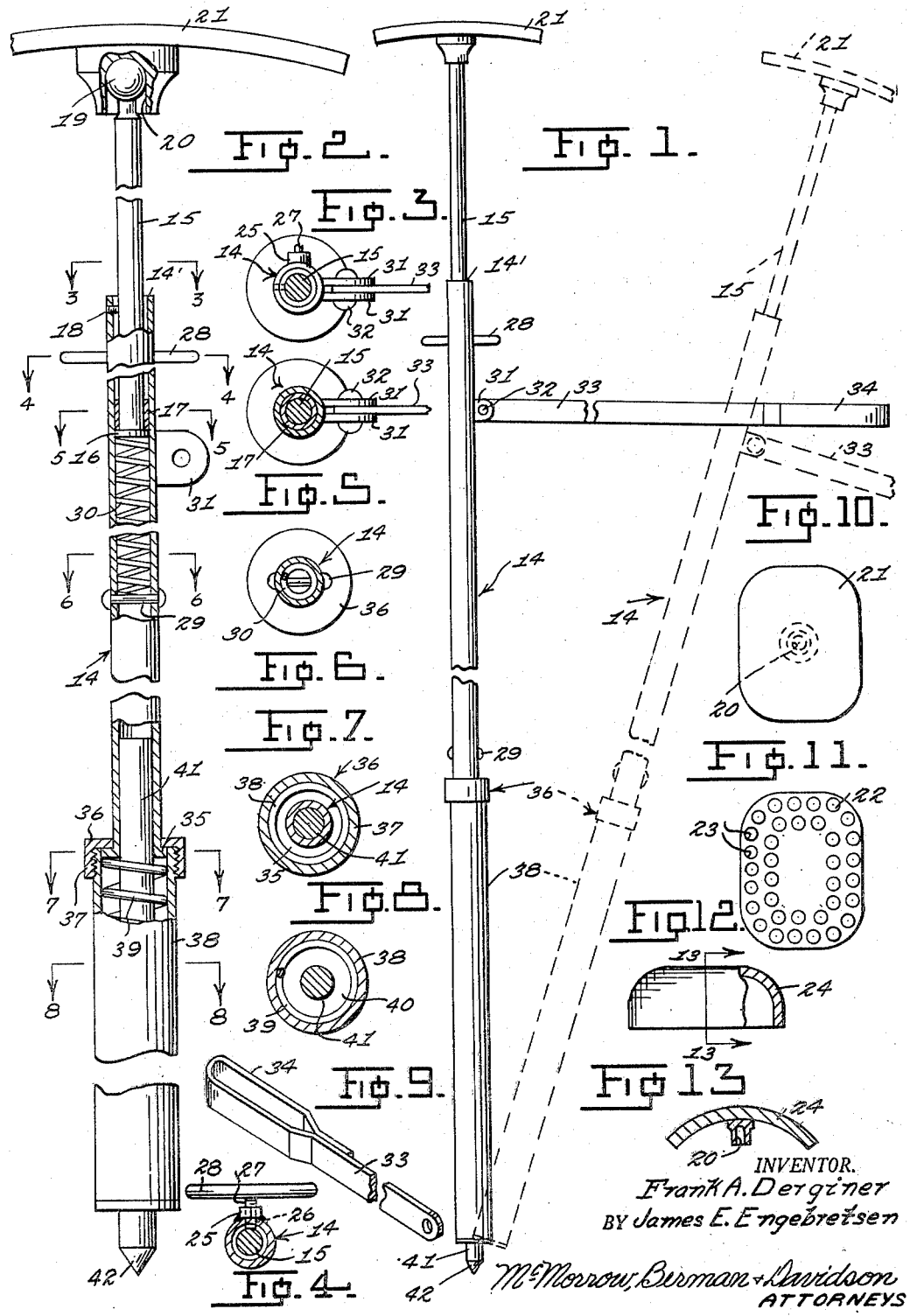
INVENTOR.
Frank A. Derginer
BY James E. Engebretsen
McMorrow, Berman & Davidson
ATTORNEYS Patented Aug. 8, 1950

2,517,547

UNITED STATES PATENT OFFICE 2,517,547

AUTO BODY SELF-ADJUSTING SPRING DOLLY

Frank A. Derginer and James E. Engebretsen, Green Bay, Wis.

Application October 29, 1948, Serial No. 57,252

6 Claims. (Cl. 153—32)

Our invention relates to tools for repairing the damage to the sheet metal portions of an automobile body. More particularly, our invention relates to a tool for resiliently or otherwise applying a dolly block to one surface of a damaged sheet metal portion of an automobile body, while the opposite surface of such body portion is hammered or dinged to straighten out dents in the body portion.

In the repair of certain portions of the sheet metal comprising an automobile body, particularly the roof of the vehicle, it is frequently very awkward for a single operator to simultaneously hold a dolly block in position at one side of the roof while applying repairing pressure to the opposite surface of the roof. Indeed, at certain times it is impossible for a single mechanic to accomplish the repairs, whereby it becomes necessary for him to have an assistant.

With the foregoing in view, it is an object of our invention to provide an improved dolly for automobile body repairs.

A further object is to provide an improved dolly for automobile body repair which includes a base, a dolly shaft slidably adjustable into and out of the base whereby to extend or contract the tool, and wherein said dolly shaft includes a forward end including means for readily detachably connecting the same to a dolly block.

A further object is to provide an improved dolly for automobile body repair such as that last described and which includes an elongated, laterally-directed handle pivoted to the base whereby a single operator may remotely control the positions of the dolly.

A further object is to provide in an improved dolly for automobile body repair such as that last described resilient means carried by the base, and loading the dolly shaft and dolly block for projecting movement toward the work.

Other objects and advantages reside in the particular structure of the device, the structure of the elements forming the device, combination and arrangement of such elements, all of which will be readily apparent to those skilled in the art upon reference to the attached drawing in connection with the following specification, wherein the invention is shown, described and claimed.

In the drawing:

Figure 1 is an elevational view of the dolly according to the invention, parts being broken away;

Figure 2 is a view similar to Figure 1, but on a slightly enlarged scale and including parts shown in longitudinal section as well as parts broken away;

Figure 3 is a transverse sectional view taken substantially on the plane of the line 3—3 of Figure 2;

Figure 4 is a similar view taken substantially on the plane of the line 4—4 of Figure 2;

Figure 5 is a similar view taken substantially on the plane of the line 5—5 of Figure 2;

Figure 6 is a similar view taken substantially on the plane of the line 6—6 of Figure 2;

Figure 7 is a similar view taken substantially on the plane of the line 7—7 of Figure 2;

Figure 8 is a similar view taken substantially on the plane of the line 8—8 of Figure 2;

Figure 9 is a perspective view of the handle for positioning the dolly of the invention apart from the rest of the structure, parts being broken away;

Figure 10 is a plan view of a form of dolly block for use with the device according to the invention;

Figure 11 is a view like Figure 10 of a different form of dolly block;

Figure 12 is an elevational view of a further form of dolly block;

Figure 13 is a transverse sectional view taken substantially on the plane of the line 13—13 of Figure 12.

Referring specifically to the drawing, wherein like reference characters have been used throughout the several views to designate like parts, 14 designates a tubular base of any desired length which is open at the upper end 14 thereof and loosely and slidably receives therein a dolly shaft 15. The dolly shaft 15 includes a radially-directed annular flange 16 on its lower end which has a relatively close sliding fit in the base 14. A dolly shaft collar 17 is loosely disposed about the lower end of the dolly shaft 15 and rests atop the flange 16. The purpose of the collar 17 is to steady the lower end of the shaft 15 as the same slides or rotates in the base 14. The base 14 adjacent the upper end 14' thereof is provided with a radially inwardly-directed set screw 18 which is adapted to engage the collar 17 and/or the flange 16 to prevent accidental withdrawal of the dolly shaft 15 from the base 14. At the same time, by retracting the set screw 18, the dolly shaft may be withdrawn from the base.

The upper end of the dolly shaft 15 is provided with a ball head 19 which is freely seatable in a ball socket 20 of any suitable or well known form of dolly block 21. Thus, the dolly block 21 is mounted on the ball head 19 for universal movement relative thereto. The dolly block 21 is illustrated in Figure 10 and Figures 11, 12 and 13 illustrate modified forms of dolly blocks interchangeably usable with the dolly shaft 15. Thus, the dolly block 22 is essentially similar to the dolly block 21, except that the same is formed with a plurality of perforations 23 extending therethrough and covering substantially the entire surface area of the block. Likewise, the dolly block 24 of Figures 12 and 13 is illustrative of various shapes which blocks according to the invention may assume. It is, of course, understood that all of the dolly blocks 21, 22 and 24 are provided with ball sockets 20 on their rear surfaces for universal engagement with the ball head 19 of the dolly shaft 15.

As best seen in Figure 4, a radially-directed boss 25 is fixedly secured to the base 14 adjacent the upper end 14' thereof. Such boss 25 may comprise a nut welded to the outer periphery of the base 14. Likewise, it is essential that the bore of the nut 25 coincide with a radially-directed bore 26 formed through the wall of the base 14. Any suitable set screw 27 may be projected radially inwardly through the boss 25 and bore 26 for engagement with the dolly shaft 15 whereby to lock the same in a selected projected position relative to the base 14. If desired, the set screw 27 may be provided with a relatively large handle 28 to facilitate the manipulation of the screw.

An intermediate portion of the base 14 is provided with any suitable means such as the rivet 29 which provides a rear stop or base or seat for the rear end of an expansive coil spring 30. The upper end of the spring 30 bears against the inner end of the dolly shaft 15 whereby the dolly shaft is loaded for projection forwardly and axially of the base 14. Thus, with the base 14 seated against a suitable support, such as the floor of a motor vehicle, the spring 30 is effective to project the dolly block 21 against the under surface of the roof of the vehicle, while the outer surface of the roof is being dinged or otherwise subjected to repair pressure. As long as the location of the dent in the roof is adjacent one side or end of the vehicle, the base 14 may be readily retained in position by the operator without discomfort. However, as frequently occurs, the base 14 must be positioned beyond the normal reach of the operator, whereby means now to be described have been provided for his convenience. Thus, a pair of vertically-disposed, laterally-spaced ears 31 are fixed to the base 14 at any desirable location. The ears 31 are provided with aligned apertures whereby to permit spanning of the ears by any suitable pivot 32 which pivotally mounts the inner end of a handle 33. The handle 33 is relatively elongated and the other end thereof is provided with any suitable hand grip 34. The hand grip 34 may be in the form of an elongated loop as shown. It is apparent from the foregoing that the provision of the handle permits the dolly to be readily manipulated by the operator within the limits of the length of the handle 33. In this connection, it is frequently only necessary to tilt the dolly slightly as the universal connection between the ball head 19 and dolly block 21 permits the latter to sit flatly against the inner surface of the vehicle roof at all times.

It is apparent from the foregoing that the set screw 27 may be utilized to lock the dolly shaft 15 in a selected projected position relative to the base 14. However, such locking of the dolly shaft obviously prevents the spring 30 from functioning to provide a resilient backing for the under surface of the portion of the car body being repaired. As such a resilient backing is highly desirable in body repairs of this character, means now to be described have been provided. Thus, the lower end of the base 14 may be outwardly directed to provide an annular flange 35 which slidably and rotatably supports an inverted cup-shaped cap 36. The cap 36 is provided with an interiorly-threaded cylindrical flange 37 which threadedly engages the upper end of a housing 38. The housing 38 is tubular and concentrically disposed relative to the base 14 and is slidable and rotatable on the flange 35 of the base. Thus, the housing 38 is telescopically extensible and retractable relative to the rear end of the base 14. Likewise, as clearly shown in Figure 2, the housing 38 is substantially over size, whereby to provide room for an expansive coil spring 39 concentrically disposed inwardly of the housing. The housing 38 is closed at the rear by a floor 40 which provides a lower seat for the spring 39. Likewise, the floor 40 has fixedly secured thereto a centering rod 41, the upper end of which is slidable in the base 14 to provide a guide. The lower end of the centering rod 41 is preferably pointed, as at 42, whereby to provide a firm base for the dolly. Thus, with the set screw 27 engaged with the dolly shaft 15 to lock the same against relative sliding movement in the base 14, the resiliency of the spring 39 provides a resilient base for the dolly shaft 15 and base 14 while repairs are being effected on the automobile body. At the same time, by loosening the set screw 27, the dolly shaft 15 and dolly block 21 may be adjusted readily for initially positioning the dolly relative to the body portion to be repaired. Thereafter, the set screw 27 may be engaged and operations commenced.

While we have shown and described what are now thought to be the preferred embodiments of the invention, it is to be understood that the same is susceptible of other forms and expressions. Consequently, we do not limit ourselves to the precise structures shown and described hereinabove except as hereinafter claimed.

We claim:

1. A dolly for automobile body repair, comprising an elongated base, a dolly shaft telescopically slidable in said base longitudinally thereof, spring means in said base and operatively engaging said dolly shaft to project the latter longitudinally outwardly of said base, said dolly shaft including a head, means for readily detachably connecting a dolly block to said head, a centering rod slidable in said base in axial alignment with said dolly shaft, said centering rod projecting from said base in a direction opposite to said dolly shaft, and spring means in said base loading said centering rod for sliding projecting movement relative to said base.

2. A dolly for automobile body repair, comprising an elongated base, a dolly shaft telescopically slidable in said base longitudinally thereof, spring means in said base and operatively engaging said dolly shaft to project the latter longitudinally outwardly of said base, said dolly shaft including a head, means for readily detachably connecting a dolly block to said head, a centering rod slidable in said base in axial alignment with said dolly shaft, said centering rod projecting from said base in a direction opposite to said dolly shaft, and spring means in said base loading said centering rod for sliding projecting movement relative to said base, and means for releasably locking said dolly shaft in a selected projected position.

3. A dolly for automobile body repair, comprising an elongated tubular base having front and rear ends, a dolly shaft telescopically slidable in said base axially thereof, an expansive coil spring in said base, said dolly shaft including an inner end bearing on said spring whereby said spring loads said dolly shaft for projection axially outwardly of said front end of said base, said dolly shaft including a front end formed with a ball head, a dolly block including a rearwardly-directed ball socket freely receiving said ball head therein to mount said dolly block on said shaft for universal movement relative thereto, a tubular centering rod housing concentrically disposed about said rear end of said base, a centering rod fixed in said housing axially thereof and slidably guided in said rear end of said base, said centering rod including a pointed end projecting axially rearwardly of said housing, an expansive coil spring in said housing bearing on said rear end of said base, and said last-named spring loading said housing and centering rod for rearward axial movement relative to said base.

4. A dolly for automobile body repair, comprising an elongated tubular base having front and rear ends, a dolly shaft telescopically slidable in said base axially thereof, an expansive coil spring in said base, said dolly shaft including an inner end bearing on said spring whereby said spring loads said dolly shaft for projection axially outwardly of said front end of said base, said dolly shaft including a front end formed with a ball head, a dolly block including a rearwardly-directed ball socket freely receiving said ball head therein to mount said dolly block on said shaft for universal movement relative thereto, a tubular centering rod housing concentrically disposed about said rear end of said base, a centering rod fixed in said housing axially thereof and slidably guided in said rear end of said base, said centering rod including a pointed end projecting axially rearwardly of said housing, an expansive coil spring in said housing bearing on said rear end of said base, said last-named spring loading said housing and centering rod for rearward axial movement relative to said base, and means for releasably locking said dolly shaft in a selected projected position.

5. A dolly for automobile body repair, comprising an elongated tubular base having front and rear ends, a dolly shaft telescopically slidable in said base axially thereof, an expansive coil spring in said base, said dolly shaft including an inner end bearing on said spring whereby said spring loads said dolly shaft for projection axially outwardly of said front end of said base, said dolly shaft including a front end formed with a ball head, a dolly block including a rearwardly-directed ball socket freely receiving said ball head therein to mount said dolly block on said shaft for universal movement relative thereto, a tubular centering rod housing concentrically disposed about said rear end of said base, a centering rod fixed in said housing axially thereof and slidably guided in said rear end of said base, said centering rod including a pointed end projecting axially rearwardly of said housing, an expansive coil spring in said housing bearing on said rear end of said base, said last-named spring loading said housing and centering rod for rearward axial movement relative to said base, and an elongated handle pivoted to said base and extending laterally thereof.

6. A dolly for automobile body repair comprising an elongated base, a dolly member telescopically engaging said base for slidable movement longitudinally thereof, spring means engaging said base and said dolly member biasing said member longitudinally outwardly of said base, a dolly block connected to said member, a centering member slidably engaging said base in axial alignment with said dolly member, said centering member projecting from said base in a direction opposite to said dolly member, and spring means engaging said centering member and said base for biasing said centering member away from said base.

FRANK A. DERGINER.
JAMES E. ENGEBRETSEN.

REFERENCES CITED

The following references are of record in the file of this patent:

UNITED STATES PATENTS

| Number | Name | Date |
|---|---|---|
| 1,850,073 | Countryman | Mar. 22, 1932 |
| 1,973,056 | Fleming et al. | Sept. 11, 1934 |
| 2,071,281 | George | Feb. 16, 1937 |
| 2,148,619 | Hauschild | Feb. 28, 1939 |
| 2,263,423 | Kattrein | Nov. 18, 1941 |